Figure 2:
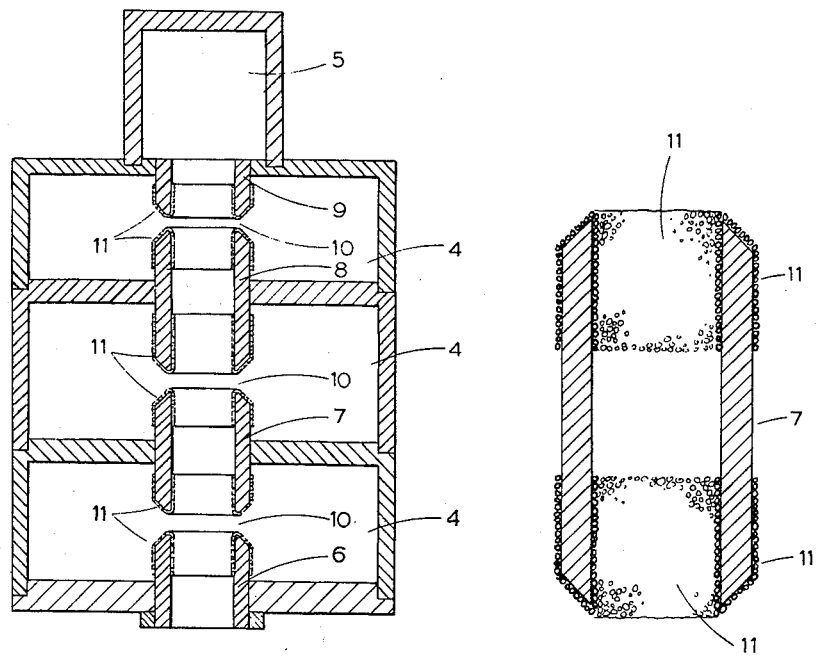

Sept. 26, 1961 K. H. R. C. KREUCHEN ET AL 3,001,893
FORMATION OF FIRMLY ADHERENT COATINGS OF
REFRACTORY MATERIALS ON METALS
Filed March 20, 1959

*Inventors*
K.H.R.C. Kreuchen
P.C. Barrett
By Clarence Downing Reibold *Attys*

United States Patent Office 3,001,893
Patented Sept. 26, 1961

3,001,893
FORMATION OF FIRMLY ADHERENT COATINGS OF REFRACTORY MATERIALS ON METALS
Karl Heinz Robert Christian Kreuchen, Hounslow, and Philip Cecil Barrett, Hayes, England, assignors to Electric & Musical Industries Limited, Hayes, England, a company of Great Britain
Filed Mar. 20, 1959, Ser. No. 800,753
Claims priority, application Great Britain Mar. 25, 1958
17 Claims. (Cl. 117—217)

This invention relates to the formation of firmly adherent coatings on metal of refractory materials such as the carbides or oxides of the refractory metals tungsten, tantalum, niobium, titanium, zirconium, or hafnium.

It is known that the carbides and oxides of the above refractory materials have a very low secondary electron yield and for this reason they have been employed as coatings on various metals to form electrode parts of electron discharge devices.

In applying such coatings the refractory material in powder form is mixed with a suitable organic binder and applied to the surface to be coated such as by painting or spraying and the binder is removed by heating. With metals having a sufficiently high melting point it is possible to employ an intense heating at 1600° C. or higher at which temperatures the carbide or oxide particles, the melting point of which are in excess of 2000° C., become sintered together and to the metal. However, such a sintering method cannot be employed when dealing with metals which have a lower melting point than the temperature at which sintering occurs, such as the metals copper, silver, gold, nickel, iron or nickel iron alloys. Furthermore it is desirable even when forming coatings on metals which can withstand the sintering temperature to employ temperatures below 1500° C. because furnaces for temperatures above 1500° C. are extremely expensive.

Although it has been possible to provide copper and the other mentioned metals with coatings of refractory materials, the coatings so provided are not firmly bonded to the metal and the somewhat loosely adhering particles forming such coatings can be easily dislodged therefrom by thermal, mechanical or electrical forces.

With the method proposed by the present invention firmly adherent exposed coatings of refractory material can be applied to metal bodies to form adherent coatings by heating to a temperature which is much lower than the aforesaid sintering temperature whereby adherent coatings of refractory materials may be applied to bodies of relatively low melting point such as copper.

It is an object of the present invention to provide an improved method whereby firmly adherent coatings of refractory material may be formed on metals having a melting point above 600° C.

According to one feature of the invention there is provided a method of providing an exposed coating of a refractory material on a surface of a metal body having a melting point above 600° C. comprising coating said surface with said refractory material in powder form and an active metal, heating said coated surface under non-oxidising conditions to a temperature below the melting point of said body to form an alloy solder comprising said active metal and said metal body, said alloy having a lower melting point than said active metal and said metal body and maintaining said temperature for such a time as to cause said solder to flow around said refractory particles joining them together and to said metal body, allowing said solder to set and thereafter treating the coated surface so as to expose surfaces of the outermost of said refractory particles.

According to another feature of the invention there is provided a method of providing an exposed coating of a refractory material on a surface of a metal body having a melting point above 600° C. comprising coating said surface with said refractory material in powder form and a powdered hydride of an active metal heating said coated surface under non-oxidising conditions to a temperature below the melting point of said body at which said active metal hydride is converted to active metal and forms with said body an alloy solder comprising said active metal and said metal body, said alloy having a lower melting point than said active metal and said metal body and maintaining said temperature for such a time as to cause said solder to flow around said refractory particles joining them together and to said metal body, allowing said solder to set and thereafter treating said coating so as to expose surfaces of the outermost of said refractory particles.

The active metal content of the coating may be from 5 to 50% and the temperature to which the coating is heated to form the solder may for instance in the case of copper be 980° C. for a period of ten minutes.

The invention is particularly suitable for the formation of low secondary electron emissive coatings on electrodes of electron discharge devices. To obtain such desirable properties from a coating of refractory material it is of course necessary for the outer surface of the refractory coating to be exposed.

Figure 1:
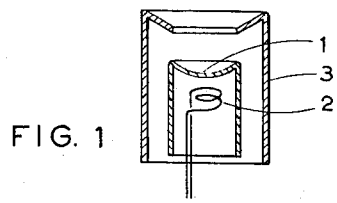
Figures 3, 4, 5, 6:
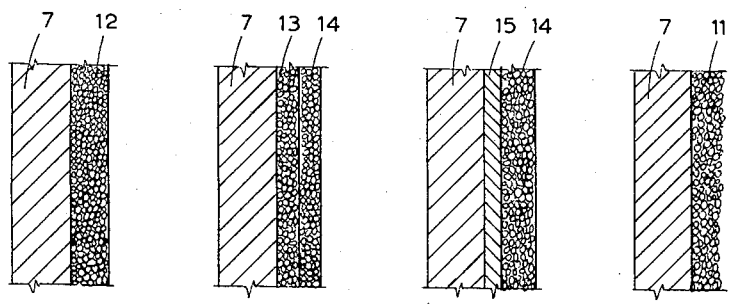

In order that the invention may be clearly understood and readily carried into effect various embodiments thereof will now be described with reference to the accompanying diagrammatic drawings as applied to the formation of a coating of refractory material on an electrode of an electron discharge device known as a klystron. In the drawings:

FIGURE 1 shows a longitudinal section through a klystron having electrodes coated in accordance with the invention, FIGURE 2 illustrates a coated electrode on an enlarged scale, FIGURE 3 shows one manner of applying the coating in an early stage of its production, FIGURE 4 shows an alternative manner of applying the coating, FIGURE 5 another alternative manner of applying the coating and, FIGURE 6, illustrates the coating shown in FIGURES 3, 4 or 5 as it appears at the completion of its production.

The klystron shown in FIGURE 1 comprises an electron gun including an electron emitting cathode 1, a heater 2 therefor and a screen 3 said gun serving to generate a beam of electrons which is caused to pass through three resonant cavities 4 to a collector 5. Associated with the cavities 4 are drift tubes 6, 7, 8 and 9 which are mounted such as by brazing to the cavity walls so that end portions thereof lie adjacent to each other within the cavities 4 and thereby form interaction gaps 10 in said cavities. For electrical and heat conducting reasons the parts 4, 5, 6, 7, 8 and 9 are usually constructed of copper. The structural details and operation of such devices are known in the art and hence no further description thereof is deemed necessary apart from explaining that in such known devices electrons in their passage to the collector 5 are liable to strike the ends of the drift tubes adjacent the gaps 10, and release secondary electrons which make multiple impacts across the gaps 10 and impose an undesirable damping on the cavities 4. The generation of such secondary electrons at this position is known as the "multipactor effect."

In accordance with one aspect of the invention the end portions of the drift tubes are coated with a firmly adherent layer of a refractory material composed of one or more refractory carbides or oxides, or a mixture of such carbides and oxides such materials in themselves being known to be poor emitters of electrons.

As shown the adjacent end portions of the tubes 6, 7, 8, 9 have a somewhat conical shape and the outer and inner surfaces of these conical end portions have an adherent coating 11 of a refractory material. One of the tubes 7 with the coating thereon is shown in greater detail in FIGURE 2.

In describing the method of applying such a coating 11 reference will also be made to FIGURES 3, 4 and 5 which show the coating on a metal body as it appears at an initial stage of its formation and to FIGURE 6 which shows the completed coating.

In FIGURES 3, 4 and 5 a portion only of a tube 7 is shown. The tube 7 is made for example of copper, silver, gold, nickel, iron or a nickel iron alloy, all of which have a melting point higher than 600° C., and is provided with a coating of a refractory material composed of one or more carbides or oxides or a mixture of such carbides and oxides of the refractory metals tungsten, tantalum, niobium, titanium, zirconium, hafnium or chromium. For example, the coating may be composed of the carbide or oxide of any one of said metals, a mixture of a carbide and oxide of any one of said metals, a mixture of the carbides or oxides of two or more of said metals or a mixture of the carbides and oxides of two or more of said metals.

The tube 7 is first thoroughly cleaned and preferably formed with a matt surface such as by lightly sandblasting and to this surface there is applied a refractory material in powder form and an active metal.

An active metal is one which always preserves its wetting properties at temperatures at which it alloys with other metals, examples of these active metals being zirconium, titanium and hafnium. The active metal may be provided in the coating by depositing a layer of this active metal onto the surface which is to receive the coating by evaporation of the active metal in vacuo or by electroplating or by applying a hydride of the active metal thereto in powdered form. For example when employing a hydride the powdered refractory material and hydride may be mixed together and suspended in a suitable medium such as ethyl acetate with a nirto-cellulose binder and applied to the tube 7 as a layer 12 (FIGURE 3) by painting or by suspending it in methylated spirits and applying by cataphoresis or in any other suitable manner. Alternatively as shown in FIGURE 4 the hydride suspended in a suitable medium such as ethyl acetate and nitro cellulose binder is applied to the tube 7 as a first layer 13 and the refractory material in a similar suspension is applied as a layer 14 covering the layer 13. The coated metal tube is placed in a furnace and is heated in vacuo, in hydrogen or in the presence of an inert gas such as nitrogen, argon, helium, neon or krypton at a temperature below the melting point of the tube 7 for such a time as to cause the hydride to be reduced to active metal and form an alloy solder comprising the active metal and the metal of tube 7 to secure said carbide or oxide to the tube. It is found that mixtures containing 5–50% hydride with 95–50% refractory material are capable of forming suitable adherent coatings.

If desired the tube 7 may be coated over the areas thereof to which the refractory material is applied with a layer of an active metal such as by evaporation of this metal in vacuo or by electroplating. Such a layer is shown at 15, FIGURE 4, and the refractory material thereon at 14. As before the coated body will then be fired at a suitable temperature to cause the active metal to alloy with the surface metal of tube 7 to form a solder which flows around the refractory particles to secure them together and to the tube.

In general a mixture in the proportions of 20% titanium hydride powder of a particle size of 10 microns or less with 80% tantalum carbide powder of a particle size of 10 microns or less may be employed, suspended in ethyl acetate with a nitro-cellulose binder so as to have a constituency of paint. The suspension may be applied as a layer of .005–.010 inch in thickness to a previously cleaned and lightly sandblasted surface of a copper tube.

A more specific example of said mixture may be:

24 grammes tantalum carbide,
6 grammes titanium hydride
4 ccs. of a 10% solution by weight of 15 sec. nitro-cellulose in butyl-acetate.
20 ccs. butyl-acetate
30 ccs. ethyl-acetate.

This tube may be placed in a vacuum furnace and fired at 980° C. for ten minutes.

During the firing process the hydride powder is converted to active metal which forms a superficial alloy with the copper and provides a solder which wets and flows around the carbide powder particles holding them tightly bonded to the copper tube. On removal from the furnace the coated tube has a metallic appearance of a golden colour due to the flow of the solder.

The coated surface in this condition would not be suitable for effectively reducing secondary emission since the refractory particles will be substantially covered with the solder and in order to expose these particles at least the solder covering the outermost surfaces of the particles must be removed and a tube formed by treating in this manner is illustrated at 9 in FIGURE 5. This partial removal of this solder may be achieved by etching or by mechanical means such as blasting the surface with particles of aluminium oxide.

When employing a copper tube coated with tantalum carbide and titanium hydride the tube after firing may be dipped for a short period in a concentrated nitric acid bath for example for 10–20 seconds. It will be found that the surface etching which takes place removes part of the solder so as to expose the grey tantalum carbide powder but by controlling the etching time adequate solder joining the powder particles will remain such that these particles are very firmly adhered to the copper tube.

When the tube 7 is made of silver and is provided with a coating of refractory material and an active metal as previously stated in respect of copper it will be found that a satisfactory solder alloy of silver and titanium can be obtained by firing in vacuo or an inert atmosphere at a temperature of 900° C. for 10 mins.; when a similar coating is applied to gold the temperature is about 980° C. but for similar coatings on the other metals mentioned such as nickel, iron and nickel iron alloys the firing temperature should be that at which superficial alloying between the foundation metal and the active metal occurs which in the case of nickel and iron and their alloys is between 1,000 and 1100° C.

When etching is employed, the solvent may be nitric acid for silver, aqua regia for gold, and hydrochloric acid for nickel and iron and their alloys.

Although the invention is particularly useful for providing coatings on electrode parts for electron discharge devices it can be applied in all cases where a firmly adherent coating of a refractory material is required to be applied to a metal surface.

What we claim is:

1. A method of providing an exposed coating of a refractory material on a surface of a metal body having a melting point above 600° C. comprising coating said surface with said refractory material in powder form and an active metal, heating said coated surface under non-oxidising conditions to a temperature below the melting point of said body to form an alloy solder comprising said active metal and said metal body, said alloy having a lower melting point than said active metal and said metal body and maintaining said temperature for such a time as to cause said solder to flow around said refractory particles joining them together and to said metal body, allowing said solder to set and thereafter treating the coated surface so as to expose surfaces of the outermost of said refractory particles.

2. A method according to claim 1 wherein said metal body is formed of copper.

3. A method according to claim 1 wherein said refractory material is a material selected from the group consisting of oxides and carbides of metals selected from the group consisting of tungsten, tantalum, niobium, titanium, zirconium, hafnium and chromium and mixtures of said oxide and carbides.

4. A method according to claim 1 wherein said active metal is applied to said body as a layer and said refractory material is applied as a layer covering said active metal.

5. A method of providing an exposed coating of a refractory material on a surface of a metal body having a melting point above 600° C. comprising coating said surface with said refractory material in powder form and a powdered hydride of an active metal heating said coated surface under non-oxidising conditions to a temperature below the melting point of said body at which said active metal hydride is converted to active metal and forms with said body an alloy solder comprising said active metal and said metal body, said alloy having a lower melting point than said active metal and said metal body and maintaining said temperature for such a time as to cause said solder to flow around said refractory particles joining them together and to said metal body, allowing said solder to set and thereafter treating said coating so as to expose surfaces of the outermost of said refractory particles.

6. A method according to claim 5 wherein said refractory material and said powdered hydride is mixed together and applied to said metal body to provide said coating.

7. A method according to claim 5 wherein said hydride powder in suspension is applied to said surface as a layer and said refractory material is applied as a layer covering said hydride layer.

8. A method according to claim 5 wherein said refractory material and said active metal hydride have particle sizes not exceeding 10 microns.

9. A method according to claim 5 wherein said coating comprises from 5 to 50% of active metal hydride and from 95 to 50% refractory material.

10. A method according to claim 5 wherein said body is formed of copper.

11. A method according to claim 5 wherein said active metal is applied to said body as a layer and said refractory material is applied as a layer covering said active metal.

12. A method of providing an exposed coating of refractory material on a surface of a non-refractory metal body having a melting point above 600° C. comprising coating said surface with said refractory material in powder form and an active metal, heating said coated surface under non-oxidising conditions to a temperature below the melting point of said body to form an alloy solder comprising said active metal and said metal body, said alloy having a lower melting point than said active metal and said metal body and maintaining said temperature for such a time as to cause said solder to flow around said refractory particles joining them together and to said metal body, allowing said solder to set and thereafter treating the coated surface so as to expose surfaces of the outermost of said refractory particles.

13. A method according to claim 12 wherein said non-refractory metal is selected from the group consisting of copper, silver, gold, nickel, iron and an alloy of nickel and iron.

14. A method of providing an exposed coating of refractory material on a surface of a non-refractory metal body having a melting point above 600° C. comprising coating said surface with said refractory material in powder form and a powdered hydride of an active metal heating said coated surface under non-oxidising conditions to a temperature below the melting point of said body at which said active metal hydride is converted to active metal and forms with said body an alloy solder comprising said active metal and said metal body, said alloy having a lower melting point than said active metal and said metal body and maintaining said temperature for such a time as to cause said solder to flow around said refractory particles joining them together and to said metal body, allowing said solder to set and thereafter treating said coating so as to expose surfaces of the outermost of said refractory particles.

15. A method according to claim 14 wherein said non-refractory metal is selected from the group consisting of copper, silver, gold, nickel, iron and an alloy of nickel and iron.

16. A method of providing on a metal electrode for an electron discharge device an exposed coating of refractory material so as to reduce the co-efficient of secondary electron emission of a surface of said electrode comprising coating said electrode surface with said refractory material in powder form and an active metal, heating said coated surface under non-oxidising conditions to a temperature below the melting point of the metal electrode to form an alloy solder comprising said active metal and the metal of said electrode, said alloy having a lower melting point than said active metal and said electrode metal and maintaining said temperature for such a time as to cause said solder to flow around said refractory particles joining them together and to said electrode, allowing said solder to set and thereafter treating the coated surface so as to expose surfaces of the outermost of said refractory particles.

17. A method of providing on a metal electrode for an electron discharge device an exposed coating of refractory material so as to reduce the co-efficient of secondary electron emission of a surface of said electrode comprising coating said surface with said refractory material in powder form and a powdered hydride of an active metal, heating said coated surface under non-oxidising conditions to a temperature below the melting point of said electrode metal at which said active metal hydride is converted to active metal and forms with said electrode metal an alloy solder comprising said active metal and the metal of said electrode, said alloy having a lower melting point than said active metal and the metal of said electrode and maintaining said temperature for such a time as to cause said solder to flow around said refractory particles, joining them together and to said metal electrode allowing said solder to set and thereafter treating said coating so as to expose surfaces of the outermost of said refractory particles.

References Cited in the file of this patent

UNITED STATES PATENTS

| 1,922,254 | McCulloch | Aug. 15, 1933 |
| 2,351,798 | Alexander | June 20, 1944 |
| 2,440,584 | Heltzer et al. | Apr. 27, 1948 |

FOREIGN PATENTS

| 907,093 | Germany | Mar. 22, 1954 |